United States Patent [19]

Specht et al.

[11] 4,059,173

[45] Nov. 22, 1977

[54] AUTOMATIC BRAKE MECHANISM FOR MILLING MACHINES

[75] Inventors: Thomas F. Specht, Arlington Heights; Juergen W. Trodler, Wheaton; Pavel Vanecek, Lyons, all of Ill.

[73] Assignee: Union Special Corporation, Chicago, Ill.

[21] Appl. No.: 749,146

[22] Filed: Dec. 9, 1976

[51] Int. Cl.² ............................................. B60T 7/12
[52] U.S. Cl. .................................. 188/110; 188/72.6; 188/151 A; 192/3 N
[58] Field of Search ............... 188/72.6, 72.9, 110, 188/151 A, 156, 157, 171; 192/2, 3 N; 310/77

[56] References Cited

U.S. PATENT DOCUMENTS

| 1,405,640 | 2/1922 | Taigman | 192/2 |
| 2,161,683 | 6/1939 | Rusnak | 188/74 |
| 2,174,018 | 9/1939 | Schaum | 192/2 |
| 2,174,398 | 9/1939 | Farmer | 188/59 |
| 2,293,375 | 8/1942 | Wigglesworth | 188/171 |
| 2,330,958 | 10/1943 | Meyer | 192/139 |
| 2,830,681 | 4/1958 | Schilling | 188/72.9 |
| 2,969,130 | 1/1961 | Logan | 192/2 |
| 3,704,757 | 12/1972 | Buress | 192/3 N |

FOREIGN PATENT DOCUMENTS

| 623,267 | 6/1927 | France | 188/72.9 |

*Primary Examiner*—Trygve M. Blix
*Assistant Examiner*—Edward R. Kazenske
*Attorney, Agent, or Firm*—John W. Harbst; John A. Schaerli

[57] ABSTRACT

An automatic brake mechanism for a milling machine which applies a braking effect upon the machine drive pulley. The automatic brake system includes an actuating device which is responsive to the de-energization of the machine drive motor. The actuating device is effective to forcibly drive a braking element into frictional braking contact with the maching drive pulley whereby preventing the same from continued rotation.

4 Claims, 5 Drawing Figures

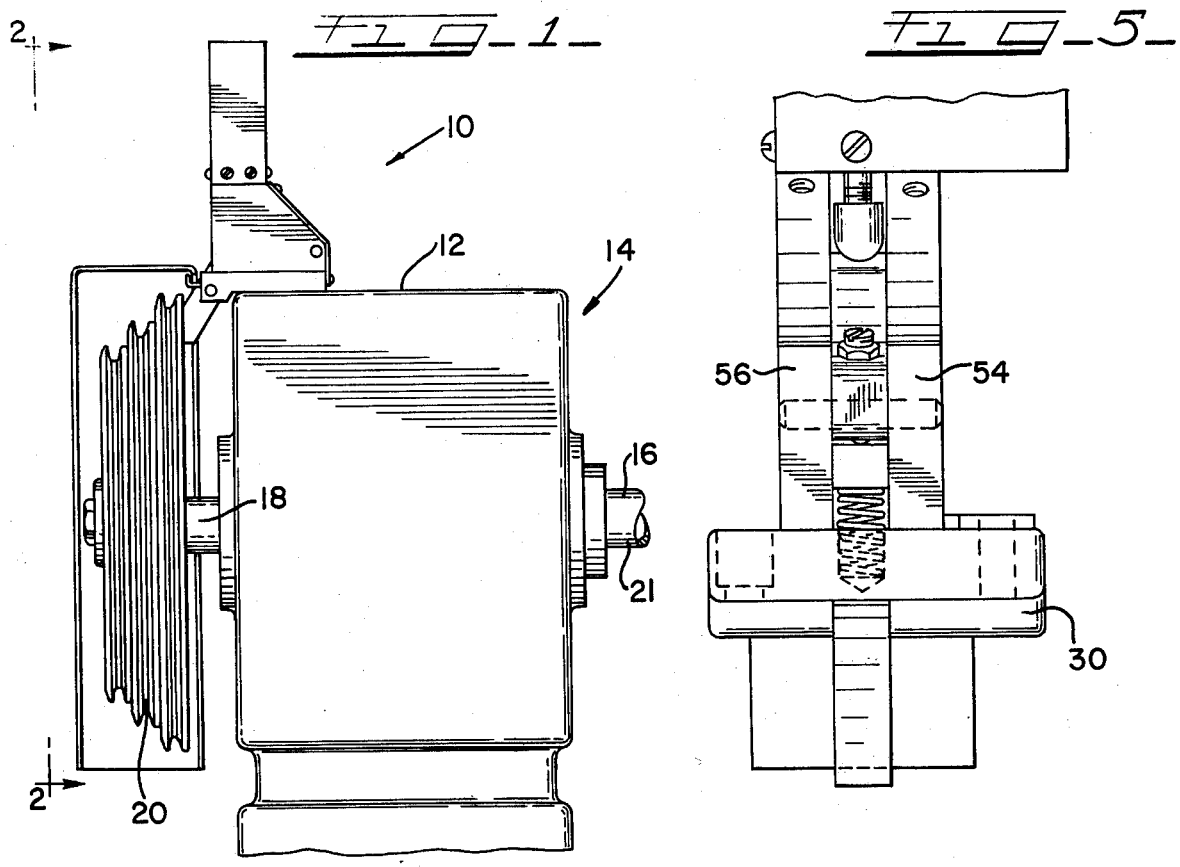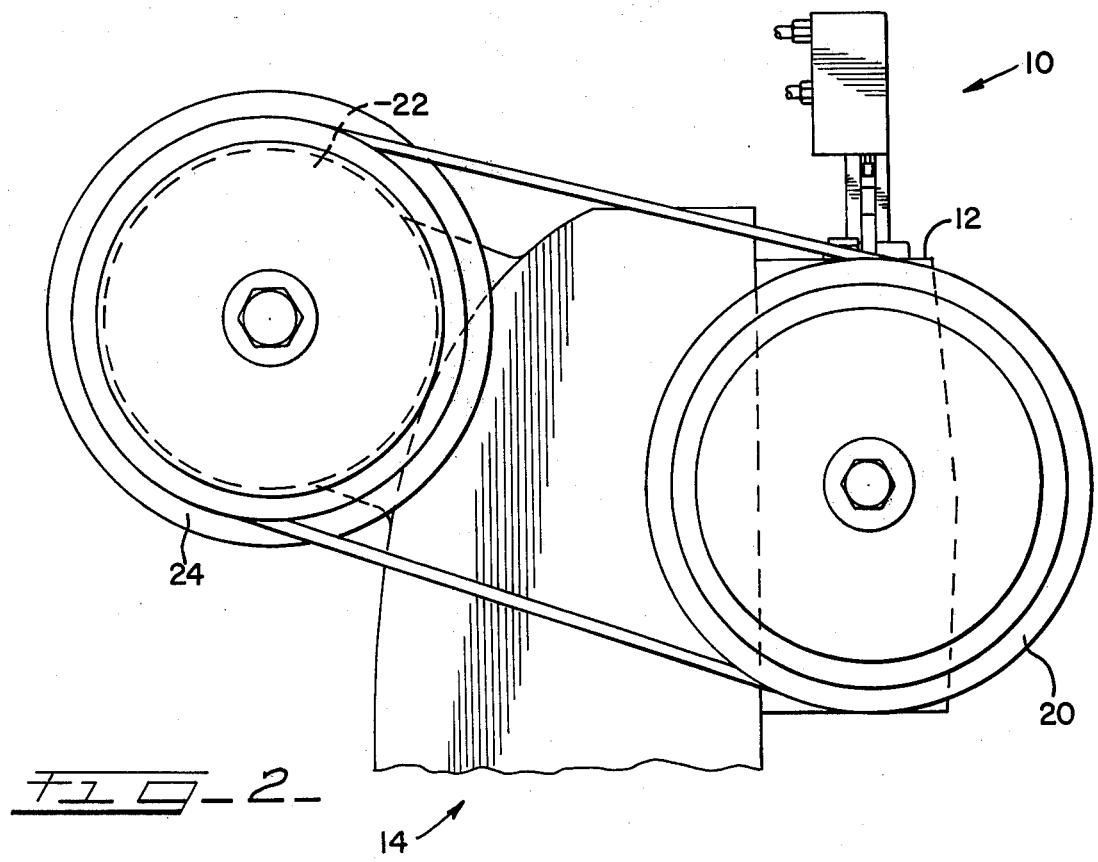

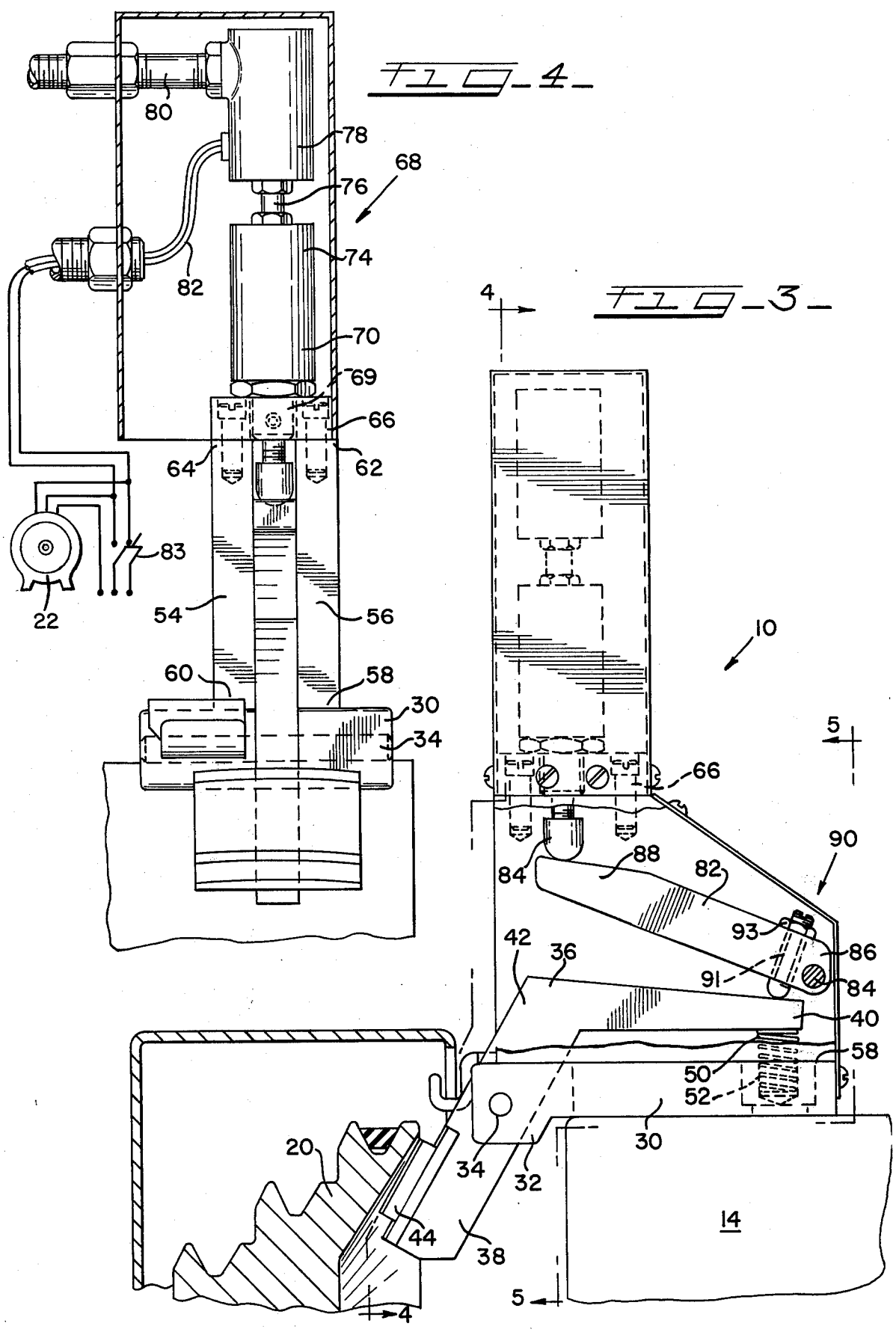

AUTOMATIC BRAKE MECHANISM FOR MILLING MACHINES

This invention relates in general to milling machines and more particularly to an automatic brake mechanism for a milling machine.

BACKGROUND OF THE INVENTION

Milling machines are made in a variety of type and sizes. The drive mechanism for some is of the type wherein a motor drives a large diameter pulley which is employed to forcibly rotate a tool. The duration of time that the tool actually works on the workpiece is relatively short in comparison to the entire workcycle and in most cases it is desirous, for safety reasons, to wait for the tool to completely stop rotating before the operator inserts his hand under the tool to remove the workpiece. Due to the large diameter of the pulley, the tool is forcibly driven even after the drive motor has been de-energized whereby greatly extending the workcycle period. This effect is primarily due to the inertia forces that are inherent with large rotating bodies. Because of the short extent of time that the tool is working on the workpiece, it is a drawback for the operator to have to wait the extended period of time while the drive pulley coasts to a complete stop before removing the workpiece. It is therefore, the present desire to provide a milling machine wherein the operator may safely place his hand under the tool immediately after de-energization of the drive motor.

SUMMARY OF THE INVENTION

In accordance with this invention, an automatic brake mechanism is provided for a milling machine which applies a braking effect upon the drive pulley of the machine once the drive motor therefore has been de-energized.

The automatic brake mechanism includes a rotatably mounted member which has first and second end portions and a medial portion therebetween. The first end portion of the member or lever is positioned closely adjacent the drive pulley while the medial portion serves to pivotally mount the lever to the machine. An actuating device is operatively connected to an operator controlled switch of the machine so that it may deliver a force to the second end portion of the lever once the motor has been de-energized. The force delivered to the second end portion of the lever forcibly rotates the first end portion into frictional contact with the drive pulley whereby overcoming the inertia forces and stopping the pulley immediately after de-energization of the motor.

Broadly stated, it is an object of this invention to provide an automatic brake mechanism for the driven pulley of a machine which will apply a braking effect upon the driven member once the driving force has been removed therefrom.

It is another object of this invention to provide means for overcoming the inertia forces of the rotating drive pulley and stop the same immediately after de-energization of the drive motor.

It is a further object of this invention to provide the means whereby reducing the work cycle of the machine.

A further object of this invention is to provide an automatic brake mechanism which is easily installed.

Another object of this invention is to provide an automatic brake mechanism which is operatively connected with the circuit of the drive motor for driving the machine.

It is yet another object of this invention to provide an automatic brake mechanism which is adjustable so as to vary the degree of rotation of the breaking member when necessary.

In the accompanying drawings annexed hereto and forming part of this specification, the present invention is shown embodied in a motor driven manually operated, horizontal-type milling machine, but it will be understood that some of the features of the invention can be embodied in other machine tools and that the drawings are not to be construed as defining or limiting the scope of the invention, the claims appended to this specification being relied upon for that purpose.

In the drawings:

FIG. 1 is a partial side elevational view of a horizontal milling machine in which the present invention is incorporated.

FIG. 2 is a partial rear elevational view as taken along line 2—2 of FIG. 1 showing the drive motor and drive pulley as mounted on the milling machine.

FIG. 3 is an enlarged partial sectional view showing the automatic brake mechanism embodied in the present invention.

FIG. 4 is an enlarged front sectional view of the automatic brake mechanism as shown along line 4—4 of FIG. 3.

FIG. 5 is a rear elevational view taken along line 5—5 of FIG. 3.

In the above mentioned drawings there has been shown but one embodiment of the invention which is now deemed preferable, but it is to be understood that changes and modifications may be made within the scope of the apended claims without departing from the spirit of the invention.

DESCRIPTION OF THE PREFERRED EMBODIMENT

In the practical development of the invention as shown in FIGS. 1 through 3, the automatic brake mechanism assembly 10 is secured to a standard Nichols hand milling machine 14. The hand milling machine 14 is provided with a horizontal cutter spindle means 16 which is appropriately journaled for rotation. The cutter spindle 16 has provided at its first end means 18 a drive pulley means 20 while at its second end means 21 the cutter spindle is provided with a milling cutter (not shown). The drive pulley 20 is formed as a stepped drive pulley such that various motor reductions can be arranged whereby providing different speeds for the cutter spindle means 16.

As viewed in FIG. 2, the drive pulley means 20 is of relatively large diameter and is driven by a motor means 22. The motor means 22 is also provided with a complementary stepped pulley means 24. It may be seen that due to the size of the pulley means 20 and 24, and keeping in mind that these pulleys are rotated at speeds up to 4000 RPM, it should be evident that the inertia inherent with these rotating bodies will continue to rotate the cutter spindle 16 even after the motor means 22 has been de-energized. The actual working time of the cutter on the workpiece is relatively short and thus it is most desirous to stop the cutter spindle means 16 and thus the tool as quickly as possible once the cutting operation has been completed whereby allowing the operator safe access to the workpiece. It has been found that it takes approximately 30 seconds for the driven pulley to coast to a stop after de-energization of the motor. It should be pointed out that the time spent on many of the operations run on these machines consume only 15 to 25 seconds of the entire work cycle. Therefore, in some cases, it takes longer for the tool to coast to a stop than the actual working time on the piece itself whereby greatly extending the work cycle for a single workpiece. For this reason, there is provided an automatic brake mechanism assembly means 10 which is mounted to the top of the milling machine 14.

As may be best seen in FIGS. 3 thru 5, the automatic brake mechanism assembly means 10 is provided with a base plate 30 which is fixedly attached in any conventional manner to a surface 12 (FIG. 1) of the milling machine 14. It should be noted that the base plate 30 is adjustably mounted on the machine so as to allow close access of the brake assembly means 10 to the drive pulley means 20. The base plate means 30 has provided at its first end means 32 a pivot pin means 34. The pivot pin means 34 serves to pivotally mount a dog leg shaped brake lever means 36. The brake lever means 36 is provided with a first end portion means 38, a second end portion means 40 and a medial portion means 42 therebetween which serves to cooperate with the pivot pin means 34 in pivotally mounting the brake lever means 36 to the machine. At its first end means 38, the lever means 36 is provided with a friction brake engaging pad means 44 which is secured thereto by any suitable means. The brake engaging pad means 44 serves to provide the braking action upon the rotating drive pulley means 20 when it is desired to stop rotation of the driven pulley means 20 and thus the rotation of the cutter spindle means 16 as will be described hereinafter. The second means 40 of lever 36 associates with a spring means 50 which is seated in a recess 52 at the rear of the base plate means 30. The spring means 50 serves to constantly urge the second end means 40 of the lever means 36 in a counterclockwise manner whereby holding the pad means 44 away from the pulley means 20 during operation of the machine.

As may be best seen in FIGS. 4 and 5 projecting upwardly from the base plate means 30 are two side plates 54 and 56. The side plates 54 and 56 mount at their first end means 58 and 60 to the base plate means 30. The second end means 62 and 64 of the base plate means serve to fixedly secure a plate means 66. The plate means 66 serves to fixedly mount one end of an actuation assembly means 69. The actuation assembly means 68 includes a spring return air cylinder means 70 and a solenoid valve means 78. The first end means 69 of the air cylinder means 70 is threadably engaged with the support plate means 66. The air cylinder means 70 has at its second end means 74 a conduit means 76 which is employed to connect the air cylinder means 70 with the solenoid valve means 78. Air is supplied to the actuation means via conduit means 80 which is connected to a pressurized source of air. The solenoid valve means is connected via electrical conduits 82 with the operator controlled switch means 83 which controls the energization and de-energization of the motor means 22. By connecting the solenoid valve means 78 with the control switch means of the machine it is possible to allow passage of air to the air cylinder means 70 when the control means is switched from the on position to the off position. Once the control means is switched to the off position, the solenoid valve means 78 allows passage of air through the conduit means 76 into the air cylinder means 70. When the air cylinder means 70 is activated a plunger means 84 connected to the driving end of the air cylinder means 70 forcibly drives the first end means 88 of a pivotally mounted lever means 82 in a counterclockwise manner as shown in FIG. 3. The brake lever means 82 is securely held and positioned between the plates 54 and 56. The lever means 82 is pivoted at its second end means 86 by a pin means 84 carried by the side plates 54 and 56. Closely adjacent its second end means 86 the brake lever means 82 is provided with an adjustable screw assembly means 90 the purpose of which will be described hereinafter. The screw assembly means includes a screw means 91 threadably engaged with the second end means of lever 36 and a locking nut means 93.

OPERATION OF THE DEVICE

Once the operator de-energizes the motor means 22 a signal is delivered to the solenoid valve means 78 to deliver a supply of air to the air cylinder means 70. Once the supply of air is received in the air cylinder means 70 the plunger or driving end means of the air cylinder 70 is forced downwardly. The downward force delivered by the actuation means 68 forcibly rotates the break lever means 82 in a counterclockwise motion about the pin means 84. The adjusting screw assembly means 90 thus transfers this driving force to the second end means 40 of the brake lever means 36. The downward force upon the brake lever means causes the second end means 40 of the lever means 36 to rotate in a clockwise manner about the pin means 34. The rotation of the lever means 36 drives the friction braking pad means 44 into frictional engagement with the pulley means 20. Keeping in mind that the pulley means 20 has been previously disconnected from the driving relationship with the motor means 22 via the de-energization of the motor means 22, the braking action applied thereto immediately stops the pulley by thus overcoming the inertia forces inherent therein.

Once the control switch 83 again energizes the motor means 22 the solenoid valve means removes the supply of air from the air cylinder means 70 and the spring action of the solenoid retracts the plunger means 84. In this manner the spring means 50 forcibly rotates the lever means 36 in a counterclockwise direction thus removing the frictional engagement with the drive pulley means 20.

After prolonged operation of the braking device the brake pad means 44 has a tendency to wear. For this reason the adjusting screw assembly means 90 is provided whereby adjusting screw 91 can be turned whereby causing a greater amount of rotation of the lever means 36 when necessary, thus compensating for the wear involved in the frictional braking pad 44.

Thus it should be apparent that there has been provided an automatic brake mechanism which comes into a braking relationship with the drive pulley means of the machine as soon as the drive motor is de-energized. By quickly braking the drive pulley means, the cutter spindle and thus the tool mounted thereon, will come to an immediate halt as soon as the de-energization of the motor takes place. This quick acting braking assembly allows the operator access to working area in a much shorter time rather than allow the pulley to coast to a brake as has been heretofore known. It has been found that by using a brake mechanism as described in the present invention that the drive pulley is completely stopped 0.01 seconds after de-energization of the motor. As may be appreciated this greatly reduces the work cycle period as compared to allowing the pulley to coast to a stop. By the provision of the automatic brake mechanism the safety factor is also greatly enhanced.

Thus it is apparent that there has been provided, in accordance with the invention, an Automatic Brake Mechanism that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What we claim is:

1. An automatic brake mechanism for a milling machine having a motor means and a drive pulley means driven thereby for rotating a tool, operator controlled switch means shiftable between an on position whereby energizing said motor means and an off position whereby de-energizing said motor means, said brake mechanism comprising:
    a rotatably mounted member means having a first end portion means closely adjacent said pulley means, a second end portion means remote from said pulley means, and a medial portion means therebetween, said medial portion means serving to rotatably mount said member means to said milling machine;
    a generally planar friction brake element means secured to the first end portion means of said member means;
    means operable when actuated to rotate said member means to bring said friction brake element means into frictional braking engagement with said drive pulley means;
    solenoid valve means having a constant supply of fluid under pressure thereto, said solenoid valve means being connected to and controlled by said operator controlled switch means, one position of said controlled switch means de-energizing said solenoid valve means to allow said fluid under pressure to actuate said operable means and the other position of said controlled switch means energizing said solenoid valve means to remove said fluid under pressure from said operable means and to de-actuate said operable means whereby engagement of said brake element means with said drive pulley means is responsive to the position of said operator controlled switch means; and
    means for biasing the first end portion means of said member means away from said drive pulley means upon energization of said motor means and said solenoid valve means whereby removing the frictional braking element means from drive pulley means, said biasing means constantly applying a force against said member means independent of the action of said solenoid valve means.

2. The automatic brake mechanism of claim 1 wherein said rotatably mounted member means is a dog leg shaped lever means.

3. The automatic brake mechanism of claim 1 further including a lever means pivotally secured between said operable means and said member means including means for adjusting the degree of rotation of said member means.

4. The automatic brake mechanism of claim 3 wherein said member means and said lever means are forcibly driven in opposite directions.

* * * * *